Feb. 28, 1933.      P. M. MILLER      1,899,289
WHEEL
Filed Jan. 24, 1930

Inventor
Philip M. Miller

Patented Feb. 28, 1933

1,899,289

UNITED STATES PATENT OFFICE

PHILIP M. MILLER, OF YOUNGSTOWN, OHIO, ASSIGNOR TO MILLER DEVICES INC., OF NEW YORK, N. Y., A CORPORATION OF NEW YORK

WHEEL

Application filed January 24, 1930. Serial No. 422,992.

The present invention relates to automobile wheels in general and has for its object to provide a wheel construction which is adapted to light and heavy duty vehicles, the purpose being to construct a light, strong, economical artillery type wheel having relatively short spokes that radiate from the central body of the structure and terminate in free spoke ends for engagement with a demountable rim while the central body is fastened on a specially provided hub and drum construction, the manufacture of which may be easily carried out and will result in a superior product.

In carrying out the features of the invention, the hub is provided with an upright annular flange or wall, radially extended from the diametrical sides thereof in opposite directions and merged with an annular transverse body or base which is merged with an upright annular wall or cylinder forming the main body of the drum and provided with an annular transverse flange, thereby forming a deeply drawn chamber having seated in the center the main hub body which is projected from the opposite faces of the first upright annular flange or wall. By means of this construction, the amount of material that is required in the manufacture of the spoked wheel body is greatly reduced in weight owing to the compensating means afforded by the increased size of the periphery of the hub and drum.

In connection with the special hub and drum, a cylindrical shell member is provided and constitutes the exteriorly visible central part of the completed wheel construction.

Another object of the invention is to provide an all-metal wheel having channeled spokes whereby air circulation is supplied to the construction that will continually cool it and dissipate the heat generated by the road friction.

Other objects and advantages of the invention in particular will be better understood from the description of the particular embodiment thereof for the purpose of which description reference should be had to the accompanying drawing forming part hereof and in which—

Figure 1:
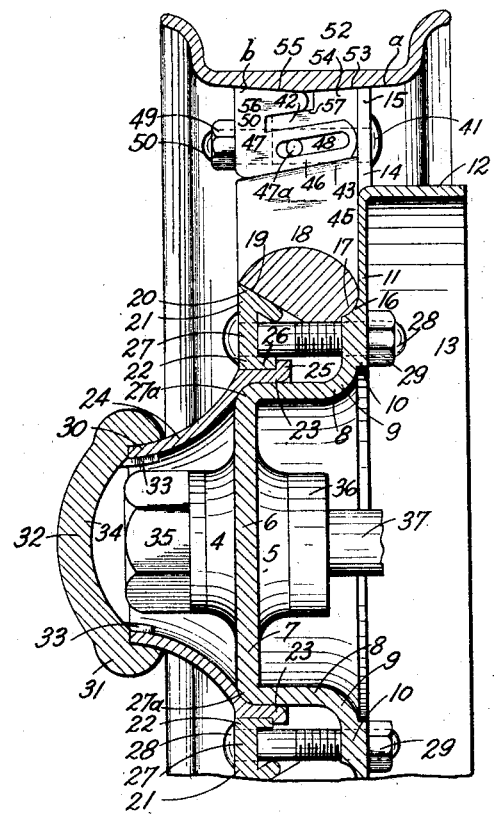
Fig. 1 is a vertical cross section of a vehicle wheel carrying a demountable tire rim and embodying the invention applied thereto.

The invention in the form illustrated is designated by corresponding characters referring to parts thereof, in which the main hub bodies 4 and 5 each transversely extends from the sturdy upright annular wall 6 which extends radially from the diametrical sides of the main hub body to provide an upright annular extension 7 which further merges with the annular transverse body 8 laterally extending to form the curved portion 9 and upright, sturdy body 10. Extending from the latter body 10 is an upright, annular wall 11 which continually extends radially outward and merges with the annular, transverse flange 12. The merged combination of the hub assembly with the drum assembly into one unit construction provides a deeply drawn chamber having seated in the center the main hub bodies 4 and 5. Extending radially outward is a member 14 projected from the outer face of the main drum body 13 and terminating in the peripheral portion 15.

As a whole the hub and drum unit constitutes the central part upon which the spoked structure is mounted and fastened to complete the wheel construction. The spider structure as a whole is positioned circumferentially on the sturdy, upright, annular body 10 having the curved annular seat 16 engaging with the corresponding contour of the inner side 17 of the central part of the spider structure 18, such engagement assuring a rigid connection between the inner side of the spider structure and outer side of the hub and drum unit. The inner part of the spider structure 18 is provided with an inclined portion 19 formed at the outer side thereof and engaging with a correspondingly annularly inclined bearing surface 20 of an annular locking member or ring 21, whose inner portion 22 is transversely, inwardly or laterally extended and engages with the transversely, inwardly extended annular flange 23 of a shell member 24, the upright annular flange 25 of which engages with and is held in locked position by the portion 26 of the transverse body 22 of the annular portion 27 of the member 21, while the shell member 24 as a whole is mounted on the outer cylindrical portion 27ª of the upright wall 7 of the hub body. A series of bolts 28 are each positioned in an aperture provided in the annular portion 27 and sturdy body 10 of the hub and drum unit, the bolts extending transversely and supporting the inner periphery of the spider structure. Each bolt 28 passes outwardly, laterally through an opening in the body 10. A corresponding series of nuts 29 are each threadedly engaged with the projected portion of the bolt thus drawing the respective bolt laterally inward, which while being engaged with the member 21, draws the member 21 into wedging engagement with the outer side of the inner or central part of the spider structure 18 and, in an indirect way, the shell member 24 is also wedged between the transverse body 26 of the member 21 and body 27ª of the hub and drum unit.

As is obvious, the inclined face 19 of the outer side of the inner periphery of the spider affords means of engaging with the inclined face 20 of the outer peripheral portion 21 of the annular member 21 to support and wedge the outer side of the spider structure as a whole and thereby holding the inner side 17 thereof in wedged engagement on the sturdy body 10 of the hub and drum unit, and the opposite or inner peripheral portion 22 of the member 21 is wedged on the portion 23 of the shell member 24 and holds the latter in engagement with the hub portion 27ª, while the bolts are tightly drawn by the nuts against the inner face of the drum. With this manner of fastening the members together the spider structure as a whole and the shell member as a whole are locked together with the hub and drum unit thus completing the wheel construction.

When the shell member 24 is so rigidly engaged with the outer peripheral portion 27ª of the hub and drum unit, the curved or arched cylindrical portion thereof projects laterally outward to form the central part of the wheel construction and whose inner cylindrical portion 23 forms means of wedging the member 21 in position and the cylindrical upright flange 25 is engaged by the flange 26 of the member 21 to prevent dislodgement of the shell from engaged position.

On the outer cylindrical periphery 30 of the shell is secured an annular cover member 31 of the main cover member 32 and is engaged therewith by the side portions 33 projecting from the inner face 34 of member 32 to close the chamber of the shell for preventing the entrance of substances into the chamber and contact with the projected portions 4 and 35 of the hub body, while the portion 36 of the latter projects laterally from the rear portion 5 into the chamber formed by the cylindrical member 8, 9 and 10 in connection with the cylindrical flange 12 of the drum 13, the portion 36 of the hub body being means of bearing the axle 37 of a vehicle.

Figure 2:
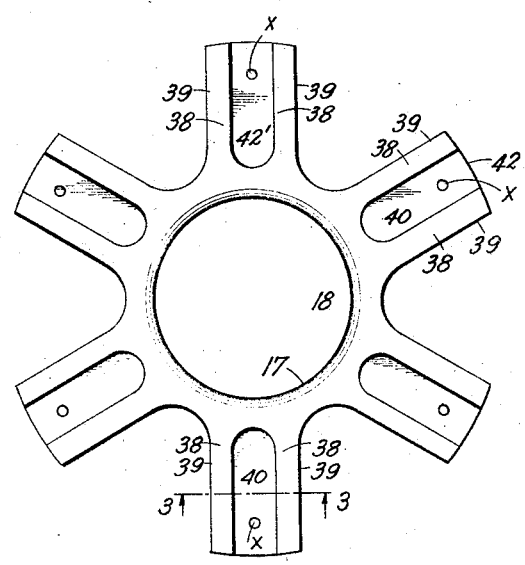
Fig. 2 is a side elevation of the wheel spoked body employed in connection with the completion of the wheel.
Figure 3:
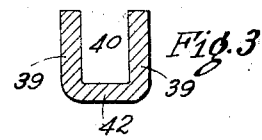
Fig. 3 is a cross section of Fig. 2 taken on the line 3—3 as indicated by the arrows.

Each spoke of the spider structure, as shown in Fig. 2, comprises an inner face 38 on each of the side walls 39 which are spaced to provide a channel 40, and the spoke as a whole is of U-shape in cross section. The extended portion 15 of the drum is in contact with the faces 38 of the walls 39 of each spoke to close the channel 40. A series of bolts 41 are each secured in an opening in the member 15 extending transversely through another opening X formed in the front wall 42 of the spoke, the bolt then being crimped in connection with the outer face of the front wall 42 to prevent its removal, and thereby to strengthen the engagement of the outer body of the drum with the spider structure as a whole for increasing the efficient strength of the bolts 28. Owing to the rigidity of each member 15 with the outer peripheral portion of the drum, the outer portion of each spoke is strengthened and the outer periphery of the spider structure as a whole is thus reinforced so that a rigid connection is provided between the spider structure and hub and drum unit.

If desired, the inner peripheral face of the flange 12 of the drum may be provided with a hard steel lining, herein not shown, which is suitably fastened in position in any manner, to form means of contacting with brake mechanism of a vehicle, in order to provide a hard contact surface in case the surface of the flange 12 is found to be soft for the purpose. The flange 12 may also be replaced as a whole by a hard steel ring fastened to the outer periphery of the drum in any suitable manner herein not shown.

An inclined seat 43 is provided on each side of the head 45, which secures one of the side portions 46 of the bifurcated clamp member 47 wherein a slot 48 is provided to pass the pin 47ª which is fixed in the side of the head, thus holding the clamp in position when the clamp is operated in connection therewith. The nut member 49 is connected to the front wall 50 of the clamp in such manner that when it is operated on the portion 51 of the bolt 41 the clamp as a whole is moved in the direction of the movement of the nut member, thereby both the clamp and nut are in inseparable relation one with another.

The rim 52 is provided with two oppositely inclined faces a and b formed on the inner periphery to provide bearings against the corresponding oppositely inclined faces 53 and 55 of the portion 54 of the spoke and portion 56 of the clamp. As shown, wedge portion 56 of the clamp is engaged on the incline 57 and is also engaged with the incline $b$ of the rim, thereby preventing outward or lateral moving of the rim while the engagement of the incline $a$ bears against the incline 53 of the spoke. When the nut member is outwardly moved, the clamp is then moved angularly outward and clearance is provided to pass the rim as a whole from the heads of the spokes.

While I have illustrated and described my invention in general, I desire it to be understood that the principle of the invention is susceptible to a wide range of variation, modification and substitution without departing from the scope and spirit of the claims.

Having thus described my invention, what I desire to secure by Letters Patent is:

1. A vehicle wheel construction comprising an artillery type cast spider structure including radiating channeled spokes and a merged circumferential body, a central hub structure comprising a central transverse body integral with a deeply formed cup-shaped member merged with a brakedrum member, a cup-shaped shell member mounted on the outer side of said deeply formed cup-shaped member to enclose the outer portion of said central transverse body, an annular member engaged with the outer portion of said cup-shaped shell member and the outer side of the circumferential body of the spider structure, bolts transversely engaged in openings in said annular member and body of the integral brakedrum member, nuts on the projected portions of the bolts drawing the assembled parts together for locking engagement therebetween, and a removable cover member engaged with the outer end of the cup-shaped shell member to complete the enclosing of the transverse body of the hub structure and to prevent entrance of extraneous substances thereinto.

2. A vehicle wheel construction comprising a central transverse hub body integral with a cup-shaped member integral with a brakedrum member, a seat at the junction of the outer portion of the cup-shaped member and inner portion of the brakedrum member, an artillery type cast spider structure comprising radiating hollow spokes merged with and terminated in a circumferential body, a contact face provided on the inner side of said circumferential body and a tapered contact face on the outer side thereof, the inner contact face of the circumferential body engaging on the seat of the integral cup-shaped member and brakedrum member, a cup-shaped shell member having an inner cylindrical portion engaged on the outer side of the cup-shaped member and brakedrum member, an annular member having an inner engaging portion engaged on the cylindrical portion of the cup-shaped shell member and a tapered portion engaged with the tapered contact face of the circumferential body of the spider structure, bolts passed through openings in said annular member and the body of the brakedrum member, nuts threaded on the laterally extended portions of the bolts drawing the said annular member laterally inwardly which in turn draws the said cup-shaped shell member laterally inwardly and causes a wedging engagement between the tapered portion of said annular member and tapered contact face of the spider structure, thereby locking the parts together, and a wall on the outer end of the cup-shaped shell member to prevent entrance of extraneous substances into the interior of the said member.

3. A vehicle wheel construction comprising a cup-shaped member integral with a transverse hub body and a brakedrum member arranged on the inner side of the cup-shaped member thereby forming the hub and drum structure for the wheel, a spider structure mounted on outer side of the combination cup-shaped member and brake drum member, a shell member mounted on the cup-shaped member, a wedge member between the spider structure and shell member, locking means drawing the registered parts together for locking engagement of one with another, members extended from the brakedrum member and in contact one with the inner face of each of the spokes of the spider structure, bolts passed through and fixed in openings in the extended members and the spokes to strengthen the position of the brakedrum member with reference to the spider structure, and a wall on the outer end of the shell member to prevent entrance of extraneous substances into the interior of the shell member.

4. In a vehicle wheel construction, the combination of a spider structure, a one-piece hub body, cup-shaped member and brakedrum member, a funnel-shaped shell member, the spider structure being engaged with the outer side of the said one-piece construction, the said funnel-shaped shell member being mounted on the outer side of the cup-shaped member of said one-piece construction, an annular securing member arranged in locking engagement with the shell member, and operating to draw the registered parts laterally inwardly and radially outwardly and locking the same together, and means mounted on the outer end of the shell member to prevent entrance of extraneous substances into the interior thereof.

5. In a vehicle wheel construction, the combination of a hollow spider structure, a one-piece hub body, cup-shaped member and brakedrum member, a shell member, the spider structure having engagement with the outer side of the cup-shaped member and brakedrum member of the one-piece structure, the shell member having engagement with the outer side of the cup-shaped member of the one-piece structure, means drawing the parts together for a locking engagement of one with another, means extended from the brakedrum member and in contact with the inner sides of the spokes of the spider structure to close the hollow portions thereof, means fastening the said last means with said spokes to prevent entrance of extraneous substances into the hollow portions of the spider structure and to strengthen the position of the brakedrum with reference to the spider structure, and means on the outer end of the shell member to prevent entrance of extraneous substances into the interior thereof.

6. The combination with a vehicle wheel, of an integral one-piece central, transverse hub, upright cylindrical deep member and circumferential brakedrum, a sturdy body uniting the member with the brakedrum, a seat on the said body, openings in the latter, means outwardly extended from the brakedrum, a shell and cover in engagement with the cylindrical deep member to enclose the said hub, and means adapted to fasten the means outwardly extended from the brake drum with the outer part of the wheel and the said sturdy body with members of the wheel.

7. In a metal vehicle wheel, in combination, a cast spider member formed free of a hub and having a relatively large open central area to facilitate casting and lighten the wheel, an integral hub and brakedrum formed with a radially extended cup-shaped portion from which the hub extends transversely, said portion serving as a support for the spider member and providing an open central area around the hub to thereby reduce the amount of metal otherwise necessary in the wheel and form a ventilating heat-dissipating chamber, said cup-shaped portion having a disk-like spider-supporting wall and a transverse wall merging with the brakedrum wall, a shell member telescoped over said cup-shaped portion, and an annular clamp member attached to the brakedrum wall and holding the spider member and shell locked in assembled position on the integral hub and brakedrum.

8. A cast metal vehicle wheel assembly comprising an integrally-cast spider member formed free of a hub and having a relatively large open central area to facilitate casting and lighten the wheel, an integrally-cast hub and brakedrum formed with a radially-extended cup-shaped portion from the center of which the hub barrel is transversely extended, said portion serving as a support for the spider member and providing an open central area around the hub barrel to thereby reduce the amount of metal otherwise necessary in the wheel and form a ventilating and heat-dissipating chamber, a shell member for closing off the hub barrel and cup-shaped portion from exterior view and completing the symmetry of the wheel, and means for locking the spider member and shell in assembled position on the integral hub and brakedrum.

9. A cast metal vehicle wheel assembly comprising an integrally-cast spider member formed free of a hub and having a relatively large open central area to facilitate casting and lighten the wheel, an integrally-cast hub and brakedrum formed with a radially-extended cup-shaped portion from the center of which the hub barrel is transversely extended, said portion serving as a support for the spider member and providing an open central area around the hub barrel to thereby reduce the amount of metal otherwise necessary in the wheel and form a ventilating and heat-dissipating chamber, a shell member for closing off the hub barrel and cup-shaped portion from exterior view and completing the symmetry of the wheel, said shell being formed with a locking flange and telescoped over said cup-shaped portion and said spider member being formed with a locking bearing surface, and a locking ring fitted against said flange and bearing surface and secured to the wall of the drum.

PHILIP M. MILLER.